April 5, 1932.  T. MANEY  1,852,977
LUBRICATING DEVICE FOR RAILS
Filed May 1, 1928  2 Sheets-Sheet 1
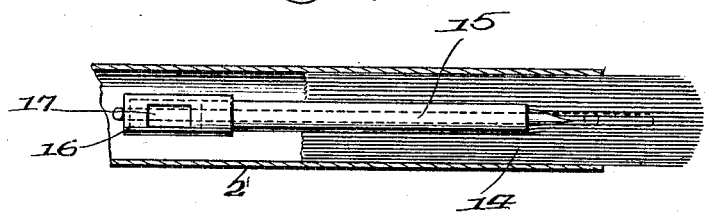
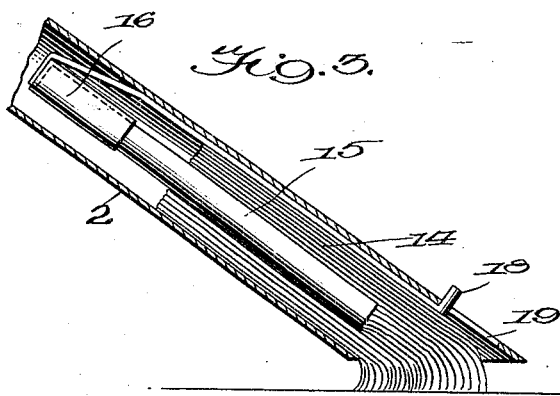
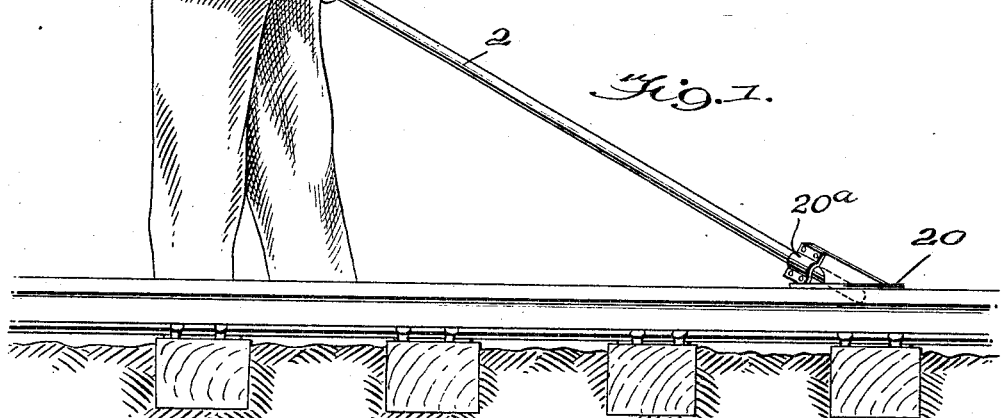
Inventor
Thomas Maney
By Vernon E. Hodges
his Attorney

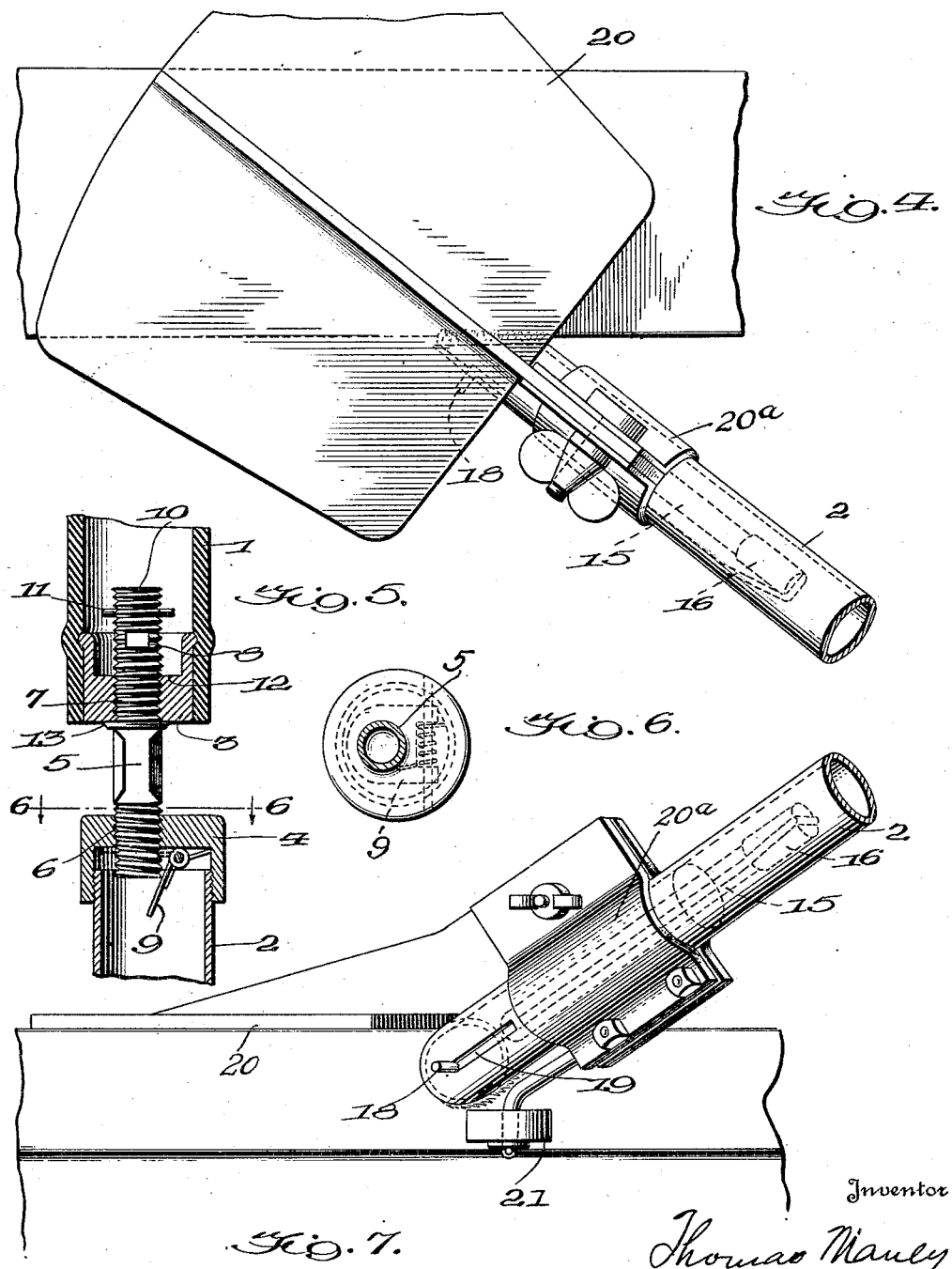

Patented Apr. 5, 1932

1,852,977

UNITED STATES PATENT OFFICE

THOMAS MANEY, OF LOUISVILLE, KENTUCKY

LUBRICATING DEVICE FOR RAILS

Application filed May 1, 1928. Serial No. 274,243.

My invention relates to an improvement in lubricating devices for rails.

In a former application, I have disclosed a device for applying semi-solid lubricant, such as graphite or grease, to rails. In my present invention, my purpose is to use any commercial fluid lubricant, such as oil, that may prove efficient and economical.

This invention consists in a tank adapted to be carried by the operator, a tube leading therefrom, and adapted to be held by the operator to direct the flow of the lubricant, and some means, such for instance as a swab, at the lower end for applying the lubricant to the rail.

The invention consists in additional features, such as a valve for directing and controlling the flow of lubricant from the tank to the tube, and for stopping the flow of lubricant when the tube and tank are disconnected.

In the accompanying drawings:

Fig. 1 is a view showing the manner of carrying and operating the device;

Figs. 2 and 3 are sectional views at right-angles showing the swab and oil-duct at the lower end of the tube;

Fig. 4 is a plan view of the lower end of the device;

Fig. 5 is a sectional view of the union between the hose and the tube;

Fig. 6 is a cross-section on the line 6—6 of Fig. 5, looking downwardly; and

Fig. 7 is a side view of the lower end of the tube.

A, represents a tank which is adapted to be held on the operator's back by straps or other means; 1, is a flexible hose; and 2 is a tube leading from the hose to the rail and adapted to be held in the hand of the operator as illustrated in Fig. 1.

In the lower end of the hose 1, a plug 3 is secured, and on the upper end of the tube 2 a cap 4 is screwed or otherwise secured.

A nipple 5 having right and left threads 6 and 7 at its lower and upper ends is adapted to screw in the plug 3 and cap 4. The nipple 5 has an inlet 8 in its upper end within the hose 1, and a spring-actuated flap-valve 9 is pivoted in position within the cap 10 automatically to close the latter when not resisted by the lower threaded end 6 of the nipple 5, which is adapted to open this valve when screwed far enough into the cap. The nipple 5 is closed at the upper end 10.

When the hose and the tube are disconnected, the stop 11 is on contact with the upper surface 12 of plug 3, and the inlet 8 is enclosed within the plug 3 whereby it is entirely closed. This turning of the nipple 5 while lowering it in the plug 3 as explained, removes it from the cap 4, and the action of the spring-valve 9 causes the latter to close the opening in the cap as the nipple 5 is withdrawn.

To connect these parts, the nipple is screwed into the plug 3 until the stop 13 engages the plug as clearly shown in Fig. 5. At the same time the lower thread 6, which, as explained, is in the reverse, is being screwed into the threaded hole in the cap 4, thereby opening the valve 9. To repeat, the reverse movement of the nipple 5 simultaneously closes the inlet D and the valve 9. At the lower end of the tube, a swab 14 of any suitable absorbent material is held, and an oil-duct 15 in the center that conducts the oil to, and distributes it within, the swab, keeping it saturated while the device is in operation. The flow into this oil-duct is controlled by a sliding cap 16 fitted on the inner end of the tube, and this has an opening 17 to allow the passage of the lubricant from the tube 2 to flow into the oil-duct 15 when the same is open as shown in Fig. 2.

The position of this cap 16 is controlled by a handle 18 which extends through a hole 19 in the tube 2, as viewed in Figs. 3 and 7.

As a simple means of guiding the device along the rail, the blade 20 slides over the rail and is connected by clamp 20a to the tube 2, and a guide-roller 21 carried by the clamp 20a guides the device from the side.

By means of this mechanism, I have provided a very simple, inexpensive and efficient means of lubricating the sides of rails, especially at curves, as a substitute for the usual crude method of applying lubricant at intervals with a stick or brush.

I claim:

1. A lubricating device including a tank, a tube, and valve mechanism interposed between and connecting the two, and constructed and adapted to cut off automatically the flow of lubricant from the tank to the tube when the two are disconnected, said valve mechanism including a nipple having reverse screw-threads at its opposite ends, and provided with an inlet, a plug, and a cap into which said threads screw, and a valve operated and controlled by the position of the nipple in the cap.

2. A device of the character described including a tank, a tube and a hose, the tube having a cap on its upper end with a threaded hole, and the hose having a plug with a threaded hole, a nipple having reverse threads at opposite ends, one end screwed into the plug, and the other into the cap, said plug closed at its upper end, and having an inlet in the side, a spring-actuated valve within the cap in position to be engaged and opened and closed by the position of the nipple in the hole in the cap, and the inlet in the nipple in position to be closed by the plug when the nipple is turned in one direction.

3. A device of the character described including a tank, a tube, a swab at the lower end thereof, an oil-duct within the tube for supplying oil to the swab, and means for controlling the supply of oil from the tube to the oil-duct, said means comprising a cap therein, and a handle for sliding the cap on the oil-duct.

4. A lubricating device comprising two members, lubricant applying means connected with one of said members, and valve mechanism interposed therebetween, said valve mechanism including a nipple having reverse screw-threads at its opposite ends to be threaded into the members, said nipple having an inlet, and a valve controlled by the position of the nipple.

5. A lubricating device comprising two members, a swab connected with one of said members, and valve mechanism interposed therebetween, said valve mechanism including a nipple having reverse screw-threads at its opposite ends, and provided with an inlet, a plug, a cap into which said threads screw, and a valve operated and controlled by the position of the nipple in the cap.

6. A lubricating device comprising two members, a swab connected with one of said members, a plug closing the end of one of said members, a cap connected with the end of the other member, a nipple having reverse screw-threads screwed into the plug and cap, said nipple having an inlet within the first-mentioned member spaced from the end thereof, means for limiting the outward movement of the nipple through the plug, and a valve operated and controlled by the position of the nipple in the cap.

7. A lubricating device of the character described comprising a tank, a sectional tube connected therewith, lubricant applying means arranged at the lower end of the tube, a nipple having reverse screw threads at its opposite ends to be threaded to the sections of the tube, and a valve controlled by the position of the nipple.

8. A lubricating device of the character described comprising a tank, a sectional tube connected therewith, a swab arranged at the lower end of the tube to supply lubricant to a rail, and a nipple having reverse screw threads at its opposite ends to be threaded into the sections of the tube, said nipple having a cut-off orifice to communicate with the tube and controlled by the position of the nipple.

In testimony whereof I affix my signature.

THOMAS MANEY.